(12) United States Patent
Reichmeyer et al.

(10) Patent No.: US 6,286,038 B1
(45) Date of Patent: Sep. 4, 2001

(54) METHOD AND APPARATUS FOR REMOTELY CONFIGURING A NETWORK DEVICE

(75) Inventors: Francis X. Reichmeyer; James Vincent Luciani, both of Groton, MA (US); Matthew B. Squire, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/128,243

(22) Filed: Aug. 3, 1998

(51) Int. Cl.[7] ................................................. G06F 15/177
(52) U.S. Cl. ........................................... 709/220; 709/222
(58) Field of Search ..................................... 709/217, 220, 709/221, 225, 222, 223, 245

(56) References Cited

U.S. PATENT DOCUMENTS

| | | | |
|---|---|---|---|
| 5,838,907 | * | 11/1998 | Hansen ............................... 395/200.5 |
| 5,867,713 | * | 2/1999 | Shrader et al. ....................... 395/712 |
| 5,870,558 | * | 2/1999 | Branton, Jr. et al. ............ 395/200.54 |
| 5,909,544 | * | 6/1999 | Anderson, II et al. .......... 395/200.38 |
| 5,951,649 | * | 9/1999 | Dobbins et al. ....................... 709/238 |
| 5,968,116 | * | 10/1999 | Day, II et al. ........................ 709/202 |
| 6,012,100 | * | 1/2000 | Frailong et al. ...................... 709/250 |
| 6,026,438 | * | 2/2000 | Piazza et al. .......................... 709/221 |

* cited by examiner

Primary Examiner—Dung C. Dinh
Assistant Examiner—Kenneth W. Fields
(74) Attorney, Agent, or Firm—Blakely, Sokoloff, Taylor & Zafman

(57) ABSTRACT

A method of remotely configuring a network device requires the generation of configuration information for the network device at a central configuration server, which is located remotely from the network device on a network. The configuration information includes a device configuration parameter. On receipt of identification information concerning the network device at the central configuration server, the central configuration server propagates the configuration information to the network device.

27 Claims, 12 Drawing Sheets

METHOD AND APPARATUS FOR REMOTELY CONFIGURING A NETWORK DEVICE

FIELD OF THE INVENTION

The present invention relates generally to the field of network computing and, more specifically, to the remote configuration of a network device by the provision of configuration information thereto from a remote location.

BACKGROUND OF THE INVENTION

Network configuration is a complex, time-consuming and expensive task. Specifically, when coupling new network devices into a network, or setting up a new network, new-coupled network devices must be configured to operate within, and communicate over, the network. For example, Internet Protocol (IP) addresses must be allocated to network devices, routing protocols specified, and subnets defined for such devices. As networks continue to become more complex, the simplification of the configuration process is becoming increasingly attractive and necessary.

SUMMARY OF THE INVENTION

According to a first aspect of the invention, there is provided a method of remotely configuring a network device. Configuration information for the network device is generated at a location remote therefrom, this configuration information including a device configuration parameter. In response to the receipt of identification information from the network device at the remote location, the configuration information is propagated to the network device.

According to a second aspect of the invention, there is provided an apparatus for remotely configuring a network device. The apparatus includes a configuration server to generate configuration information for the network device. The configuration server is located remote from a network device, and the configuration information includes a device configuration parameter. The apparatus also includes a communications interface to propagate the configuration information from the configuration server to the network device in response to receipt of identification information concerning the network device at the configuration server.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
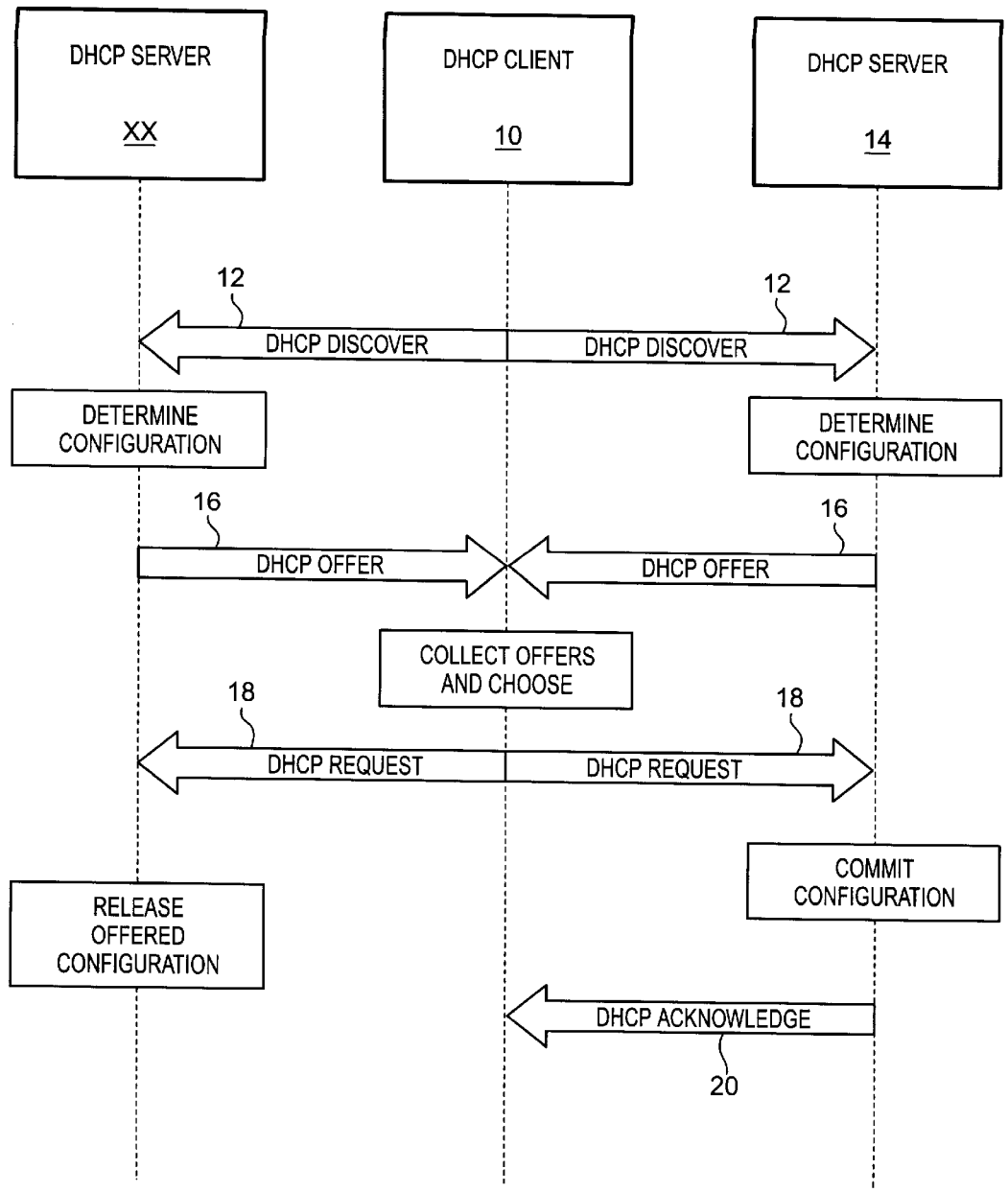
FIG. 1 is a diagrammatic representation of message exchanges between a client and server according to the Dynamic Host Configuration Protocol (DHCP).

A method and apparatus for remotely configuring a network device are described. In the following description, for purposes of explanation, numerous specific details are set forth in order to provide a thorough understanding of the present invention. It will be evident, however, to one skilled in the art that the present invention may be practiced without these specific details.

The parameters controlling the behavior of a networking device are typically stored within a configuration file (or config file). The configuration file may be created by the networking device itself or by some other configuration-capable device and then installed on the network device. Within a networking device, the configuration file may be stored within a memory resource, such as static or flash read-only memory (ROM). Alternatively, the configuration file may be stored on some other file server coupled to the networking device. When a networking device boots, the parameters in the configuration file are utilized to initiate variables on the networking device that may be specific to the type, location and intended functionality of the device. It will be appreciated that while type information (for example, whether the device is a router, switch or hub) for a networking device will be known at manufacture, the final location and intended functionality for the networking device will only be known upon installation. Accordingly, many of the parameters within the configuration file can only be ascertained upon installation.

As the parameter values to be incorporated within a configuration file are typically not known at time of manufacture, a default configuration file may be shipped with new network devices that may be used to boot the network device for the first time. This default configuration file is intended to bring the network device to an initial state in which more specific configuration may be entered, and is not intended for use within a fully installed networking device.

The configuration of a network device can be viewed as constituting two processes, namely (1) the creation of the configuration file and (2) the delivery of this configuration file to the networking device. Assuming a network device, such as a router, is residing in a default initial state, there are a number of ways in which the final configuration file may be constructed for a network device. First, if the installation environment is known at manufacture and shipping, a network device may be preconfigured with all relevant configuration parameters, including network addresses, protocol parameters, etc. When the device boots, all necessary configuration information is retrieved, for example, from a local flash memory, and the systems administrator will in this case not be required to perform any configuration tasks. Second, a system administrator may manually configure all necessary configuration parameters on-site via, for example, a console port connection. Third, a system administrator may utilize remote manual configuration to install a configuration file on, for example, a flash memory of a network device such as a router. In this case, the configuration file is created remotely from the installation site, and then transferred to the network device. The present invention teaches such a system and methodology.

Regarding delivery of a configuration file to a networking device, a number of methods may be utilized to deliver a configuration file, constructed utilizing the teachings of the present invention, to a networking device. First, where a network device is preconfigured, obviously no delivery mechanism is required. Second, where a networking device contains a removable storage media, such as for example a PCMCIA disk, the storage media may be physically moved from a configuration construction location and inserted into a network device, whereafter the configuration file may be copied from the removable storage media into the network device memory resource. No network connectivity is required for this method. Third, a systems administrator may initiate a manual file transfer program (for example, FTP or TFTP) between the networking device and a file server storing a configuration file. Some level of network connectivity to the network device is required over which such a file transfer can be conducted. Finally, an automatic file transfer may be utilized, which is similar to the above mentioned manual file transfer, except that the network device may in this case initiate the file transfer procedure automatically after determining the location of an appropriate configuration file via a configuration protocol. To such configuration protocols included the Bootstrap Protocol (BOOTP) and the Dynamic Host Configuration Protocol (DHCP).

In one embodiment, the present invention teaches utilizing DHCP or BOOTP to implement a method of the remotely configuring a network device. DHCP is fully described in the Request For Comments (RFC) 2131, and BOOTP is fully described in RFC 951. DHCP utilizes the same frame formats as BOOTP and provides additional capabilities. Accordingly DHCP may be considered as an extension of BOOTP. A brief description of DHCP will now be provided with reference to FIG. 1. DHCP is primarily a protocol for assigning dynamic Internet Protocol (IP) address to devices on a network. Accordingly, DHCP permits the automatic configuration of IP parameters on network devices. However these configuration parameters are interface specific, and do not include global or non-interface specific configuration parameters, such as for example router parameters.

When a DHCP client 10 boots, it transmits a DHCP discover message 12 on each local subnet to which the DHCP client 10 is connected (that is from all interfaces of the device hosting the DHCP client) to DHCP servers 14 coupled to such networks. Each subnet DHCP server 14 may then respond with a DHCP offer message 16 that includes an available network IP address. The DHCP client 10 receives one or more DHCP offer messages 16, and then selects one server from which to request configuration parameters, based on configuration parameters within the DHCP offer messages 16. The DHCP client 10 then broadcasts a DHCP request message 18 to each of the DHCP servers 14, each of the request messages 18 including a server identification to indicate the server selected. The DHCP server 14 selected then responds to the DHCP request message 18 with a DHCP acknowledge message 20 containing the configuration parameters requested by the DHCP client 10. It should be noted that the configuration parameters provided to the DHCP client 10 from the selected DHCP server 14 are configuration parameters for the host only (i.e., PCs or work stations that require only network address, mask of default gateway address information for a particular interface on the host). Such hosts typically run applications that generate network traffic which is propagated on a network via a default gateway. The configuration information supplied by the DHCP server 14 is usually LAN specific, and manages configuration parameters for the relevant LAN.

As stated above, DHCP permits the automatic configuration of IP parameters on an IP host, these configuration parameters being interface specific, and non-global. In one embodiment of the present invention, additional information is included within DHCP messages, by way of proprietary extensions, so as to allow for the exchange of information between a client 10 and server 14 beyond the definition in the DHCP specification. In a further embodiment, the configuration parameters returned to the client 10 from the server 14 may include the location of a configuration file. Upon receipt of information indicating this location, a client 10 may initiate an automatic file transfer operation to retrieve the configuration file.

Finally, the present invention teaches that the Simple Network Management Protocol (SNMP), as the detailed in RFC 1157 may be utilized to transfer configuration information from a remote location, such as a server, to a network device. SNMP is specifically suited to situations where only a few parameters require configuration, as each request/ response exchange modifies only a single parameter.

Figure 2:
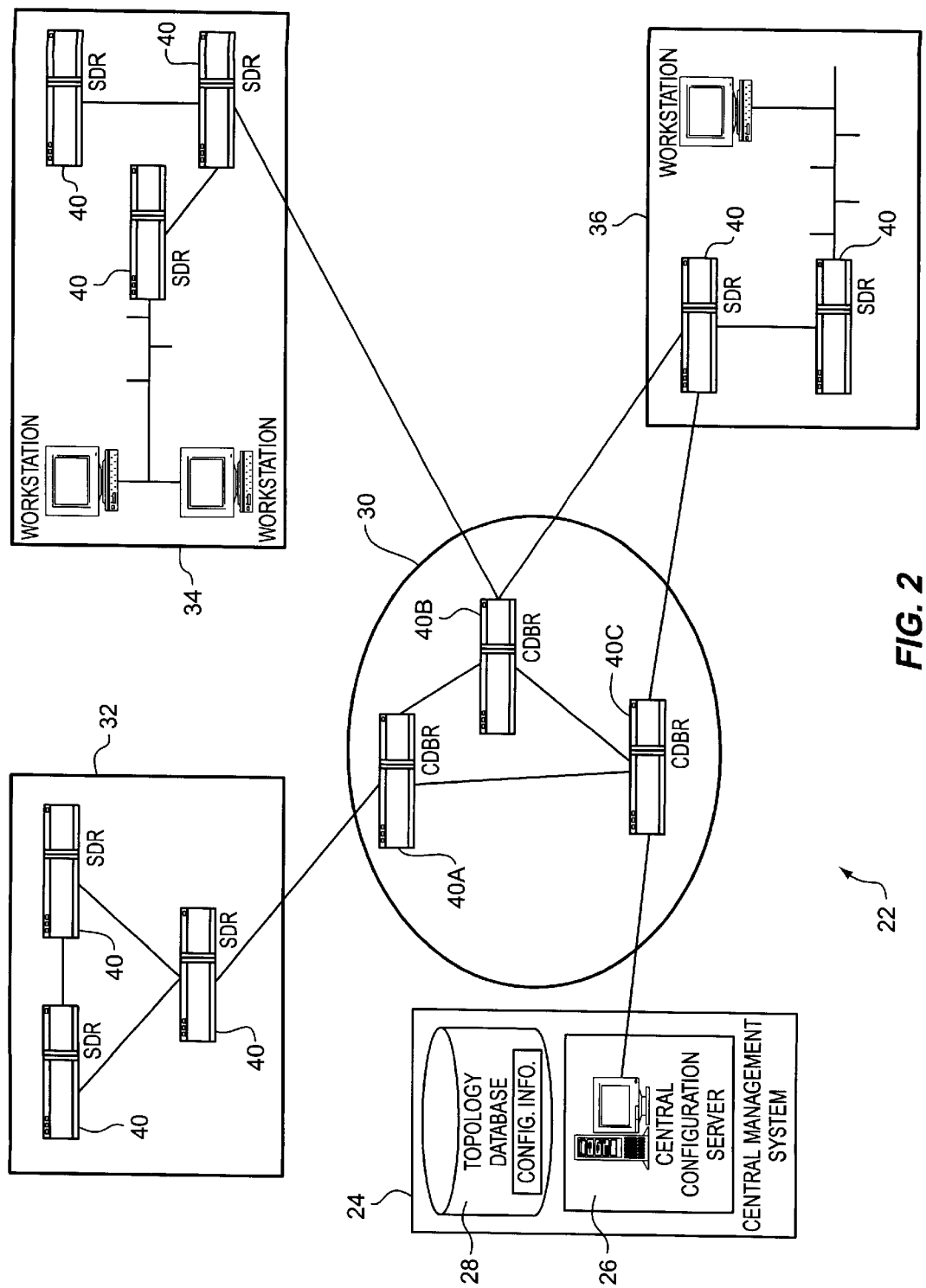
FIG. 2 is a diagrammatic representation of an exemplary network within the present invention may be implemented.

FIG. 2 is a diagrammatic representation of an exemplary network 22 within which the present invention may be implemented. The network 22 is shown to include a central management system 24 that includes, inter alia, a central configuration server 26 coupled to a topology database 28. The topology database 28 is utilized by the central management system 24 to store and retrieve information concerning the physical and logical topology of the network 22. Specifically, the physical topology information includes descriptions of physical network devices, and their physical connectivity. For example, information concerning a device type (for example, router or switch), level 2 (L2) addresses and orts may be included within the physical topology information. The logical topology information includes level 3 (L3) interface information and includes network address, subnet and routing protocol information. The physical topology information can be constructed utilizing a number of different mechanisms, such as a physical topology discovery protocol that collects information from physical topology MIBs on network devices. Logical topology information may be constructed through a relationship between physical topology MIB information and interface MIB information. The topology database 28 gathers this information, and utilizes it to construct physical and/or logical representations of the network 22. The topology database 28 may also be manually configured thus allowing new networks to be designed and classified.

The central configuration server 26 is shown to the resident on a dedicated host. It will however be appreciated that the central configuration server 26 could be accommodated on a shared host that also accommodates other servers comprising the central management system 24.

The network 22 is further shown to include four exemplary configuration domains 30, 32, 34 and 36. Specifically, utilizing the physical and logical topology information included within the topology database 28, the network 22 may be divided into a number of configuration domains, the boundaries of each configuration domain being dependent upon the size of the network 22, as well as the physical and logical topology. For example, a configuration domain may consist of a group of network devices within a specific OSPF area, as is the case with the network 22 illustrated in FIG. 2. According to one embodiment of the present invention, a configuration domain may comprise a portion of a network in which network entities are capable of "auto configuration" when appropriate topological information is supplied from the topology database 28. Each configuration domain may furthermore be divided into one or more subdomains. Depending on the way in which subdomains are defined, and the location and desired function of devices within the subdomains, some network devices within a subdomain may, according to one embodiment of the present invention, be able to determine appropriate configuration parameters for their interfaces by learning about the configuration information of neighboring devices.

Each of the domains 30-36 comprises an OSPF area and includes a number of routers 40, the routers within the domain 30 comprising a backbone portion of the network 22. The routers within the domains 32, 34 and 36 are designated as being Subdomain Routers (SDRs) as each has interfaces only in one configuration domain. Specifically each Subdomain Router is exclusive to one configuration domain, or part of one or more subdomains within a configuration domain. The routers 40 within the domain 30, on the other hand, may conveniently be identified as Configuration Domain Border Routers (CDBRs), as each has interfaces in different configuration domains. For example, router 40B one interface in the domain 34, and another interface in the domain 36. Configuration of CDBRs requires information concerning network topology, and how configuration domains within the network have been defined. Typically, configuration domains and subdomains will be defined based on logical network topology. For example, configuration domains can be made up of one or more OSPF areas, and each subdomain within a configuration domain can be one OSPF area.

Figure 3:
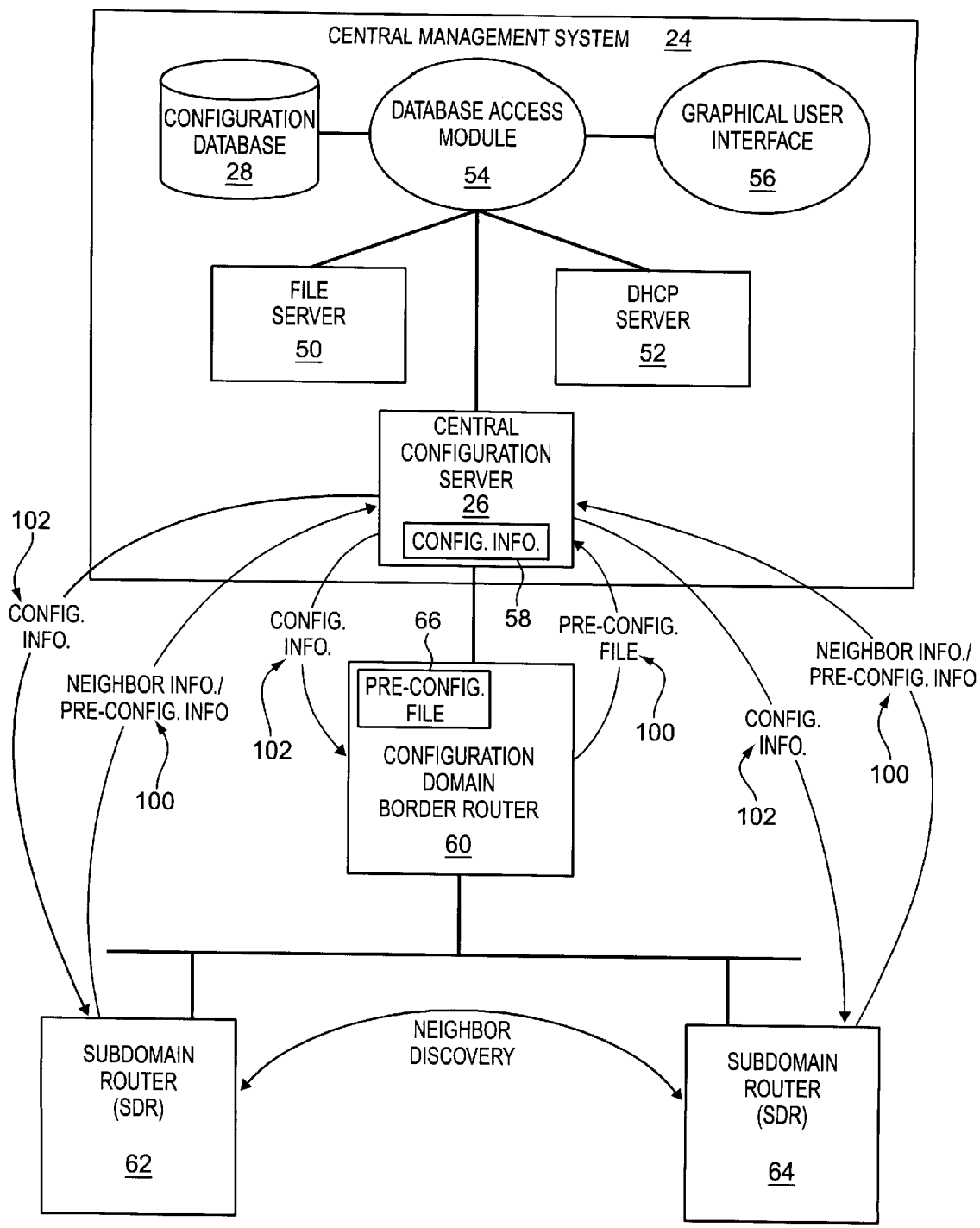
FIG. 3 is a block diagram illustrating a central management system, and the interaction between the central management system and a configuration domain border router and subdomain routers, according to one embodiment of the present invention.

FIG. 3 is a block diagram showing further details regarding the central management system 24, and the interaction between the system 24 and a configuration domain border router 60 and subdomains routers 62 and 64. Referring firstly to the central management system 24, access to the topology database 28 is provided through a database access module 54, that is available to the central configuration server 26, a file server 50 and a DHCP server 52. A graphical user interface (GUI) 56 facilitates user interaction with the central management system 24. Configuration files 58 are shown to be stored on the central configuration server 26, and are delivered therefrom to routers according to the methodologies discussed below. The DHCP server 52 is responsive to DHCP clients (not shown) hosted on network devices, in the manner described above. Upon boot of a network device or when triggered by a system administrator, a DHCP client transmits a DHCP discover message 112 on each of its interfaces. The DHCP server 52, in response to the receipt of discover messages 112, may function to direct a network device to a configuration file based on the identifier supplied within a discover message. While the file server 50, the DHCP server 52 and the central configuration server 26 are shown to comprise discrete entities within the system 24, it will be appreciated that these servers may be tightly integrated into a single server application. The configuration domain border router 60 is shown to store a pre-configuration file 66 (which may conveniently be termed a "cookie"), the use of which will be described in further detailed below. The components illustrated in FIG. 3 provided the structural basis for the functional description that follows below.

Figure 4:
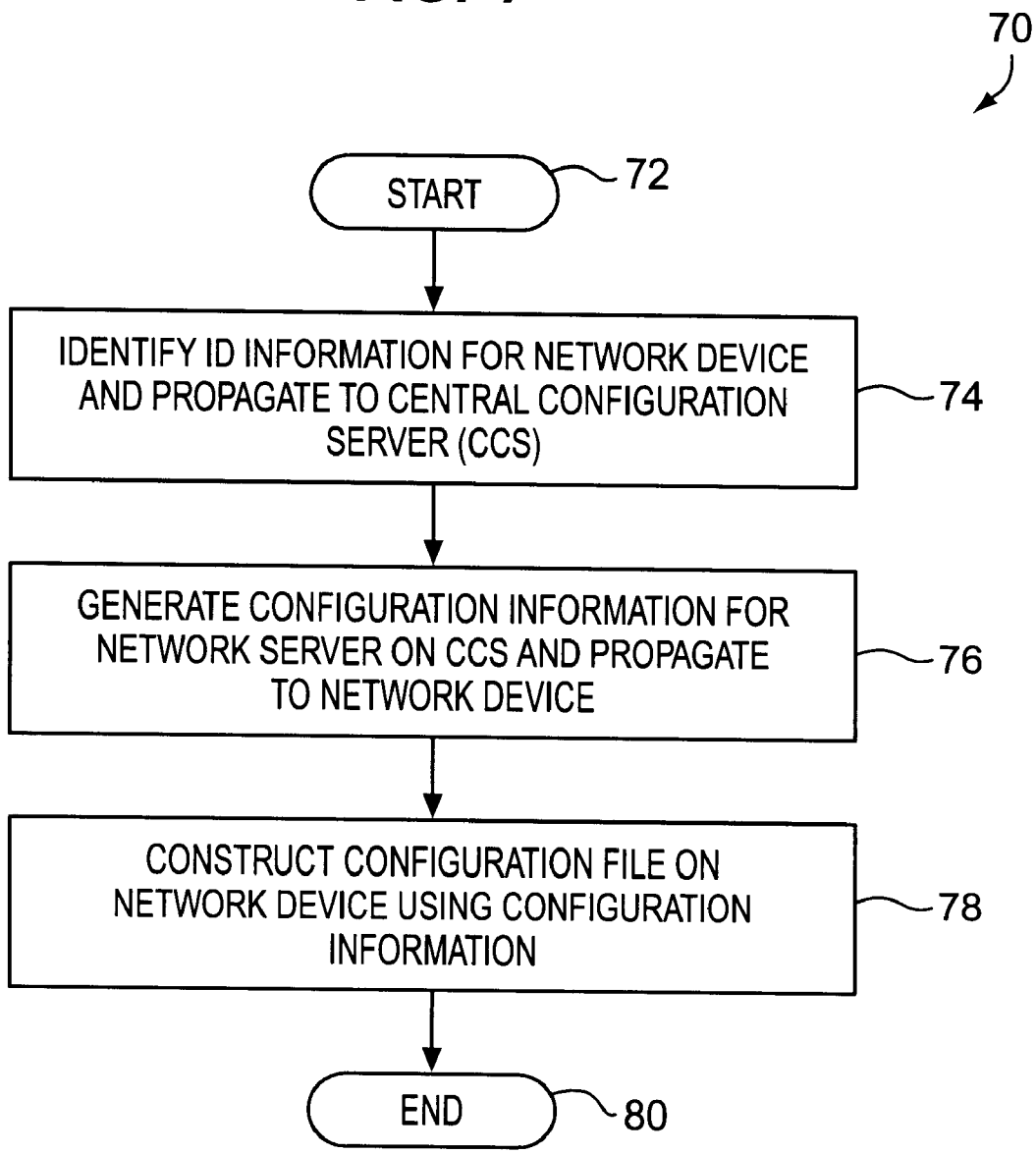
FIG. 4 is a flow chart illustrating a method, according to one exemplary embodiment of the present invention, of remotely configuring a network device.

FIG. 4 is a flow chart illustrating the broad steps of a method 70, according to one exemplary embodiment of the present invention, of remotely configuring a network device, such as for example a router or a switch. The method 70 commences at step 72, and at step 74, a network device identifies or determines identification information concerning itself, and propagates this identification information to the central configuration server 26. At step 76, the central configuration server 26 constructs configuration information, for example in the form of a Domain Configuration File (DCF), which may comprise a file containing configuration parameter information for a specific configuration domain. The configuration information is then propagated from the central configuration server 26 to the target network device associated with the identification information. At step 78, the target network device then constructs a configuration file, utilizing the configuration information received from the server 26, whereafter the method 70 terminates at step 80.

Figure 5:
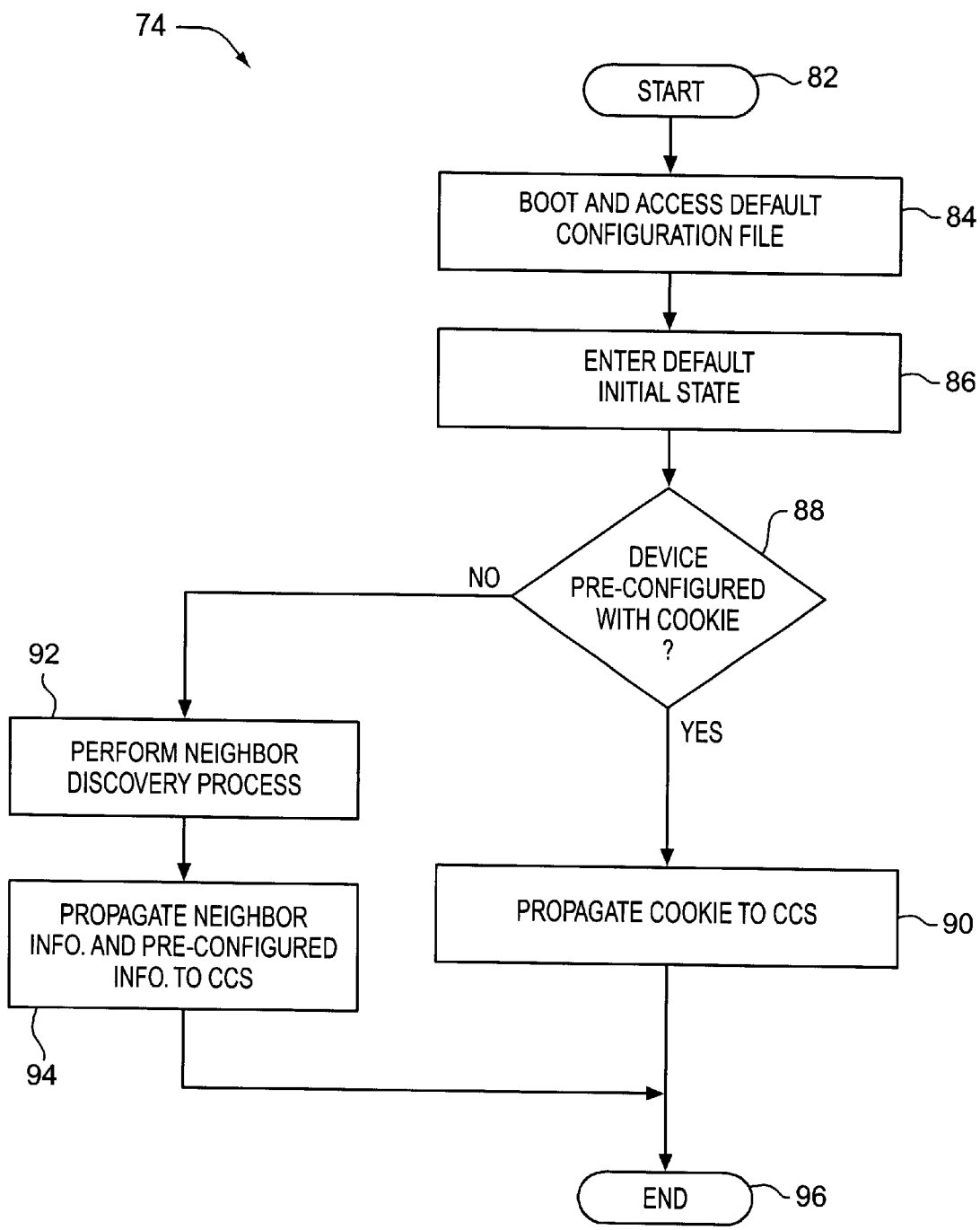
FIG. 5 is a flow chart illustrating a method, according to one exemplary embodiment of the present invention, of generating identification information for a network device and propagating this information to the central configuration server.

FIG. 5 is a flow chart illustrating a method 74 of implementing the step 74, according to one exemplary embodiment, of the method 70 shown in FIG. 4. Specifically, the method 74 is performed by a network device, such as either one of the subdomains routers 62 or 64, or the configuration domain border router 60, shown in FIG. 3. Following commencement at step 82, the network device boots and accesses a default configuration file at step 804. The default configuration file brings the network device into a default initial state at step 86, whereafter a determination is made at decision box 88 as to whether the network device has been preconfigured with a pre-configuration file 66, such as for example a "cookie". Specifically, certain network devices may require location-specific, or function-specific, configuration parameters. Such devices are most typically configuration domain border routers 60 (for example, core routers) which need to know whether they belong to a backbone network and which area, or stub, networks they are attached to. Such information is not readily obtainable through neighbor discovery, and accordingly such network devices may be unable to supply the central configuration server 26 with enough information to be recognized as a fitting into a configuration domain (as will be described below), and accordingly some pre-configured information must be passed to the central configuration server 26 to obtain appropriate configuration parameters. The pre-configuration file 66 may uniquely identify a network device in terms of the type of device, number of interfaces and location within the network 22. Specifically, a unique device-level MAC address may be included within the pre-configuration file 66. If it is determined that decision box 88 that the network device is preconfigured with a pre-configuration file 66, this pre-configuration file 66 is propagated from the network device to the central configuration server 26 at step 90. Alternatively, should the network device not have a pre-configuration file 66 assigned thereto, the network device may execute a neighbor discovery procedure at step 92. "Neighbor discovery" may be a procedure whereby a network device dynamically determines information related to its physical and logical configuration by learning about its neighboring network devices. From a level 3 (L3) perspective, a network device may determine its logical connectivity by compiling a list of directly connected subnets. A network device may also determine from neighboring devices details concerning OSPF areas, subnets masks and time-out values. Certain parameters may however not be discoverable in this manner, such as the first portion of IP addresses and filters. From a level 2 (L2) perspective, a network device may compile a list of directly connected network devices. Many level 2 (L2) devices may require minimal configuration as the spanning tree algorithm may dynamically adjust network connectivity. However, with the enetration of proprietary VLAN and Quality of Service (QoS) implementations, the configuration of level 2 (L2) devices is becoming increasingly complex. Further, a network device may use either passive or active network discovery procedures. For example, when performing a passive discovery procedure, a network device may listen on its ports for OSPF, DHCP, or router discovery messages, and then use these messages to determine the subnets on each port. Alternatively, the network device may actively participate in the router discovery process to learn of neighboring network devices. In a further embodiment of the present invention, the central management system 24 may include a Java server, and an appropriate applet could be downloaded to a network device to perform neighbor discovery.

Having collected information regarding the network environment at step 92, the network device then propagates this information to the central configuration server 26 at step 94. The method 74 then terminates at step 96. Returning to the steps 90 and 94, the identification information, either in the form of information discovered utilizing a neighbor discovery procedure or a pre-configuration file 66, may be communicated from the network device to the central configuration server 26 in a number of ways. Specifically, the exchange procedure could entail a single request/response exchange, wherein neighbor information and/or pre-configuration information is propagated from either one of the subdomains routers 62 and 64, or the border router 60, as illustrated at 100 in FIG. 3. The central configuration server 26 then propagates configuration information 102 to the network device in response to the information 100.

Figure 8:
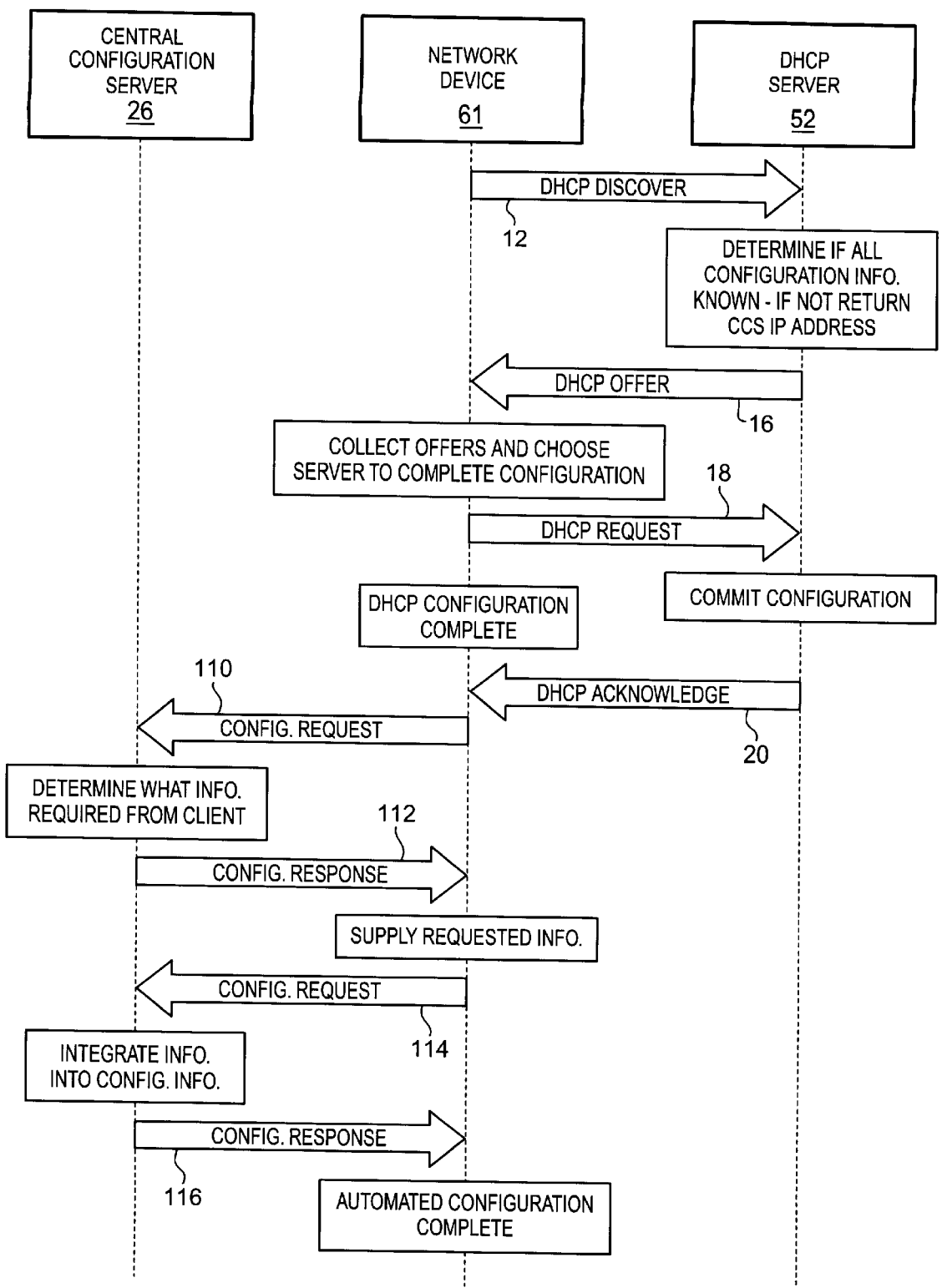
FIG. 8 is a diagrammatic representation of an exchange of messages between a network device, a DHCP server and a central configuration server, according to one exemplary embodiment of the present invention.

Alternatively, an exchange operation could be incorporated within, or on top of, the DHCP protocol to provide a robust exchange as illustrated in FIG. 8. Specifically, in this embodiment of the invention, a networking device firstly executes a DHCP procedure to obtain an IP address for itself, and to obtain an IP address for the central configuration server 26, in the manner described above. Following this exchange, the network device may send a request message 110 to the central configuration server 26 indicating the abilities and model information of the network device. The central configuration server 26 then issues a response message 112 to the network device 61, requesting further information, to which the network device 61 responds with a further request message 114 including the requested data. The central configuration server 26 then integrates this data within configuration information for the network device, and determines whether further information is needed. If the configuration information is determined by the configuration server 26 to be completed, it will then issue a response message 116 to the network device, the response message 116 including a file name for a file, containing configuration information, that the network device may retrieve utilizing a file transfer protocol, such as TP. This method is advantageous in that the central configuration server 26 may issue as many response messages to the network device as are required to collect all required configuration information.

In both of the above embodiments, physical configuration information to be included within the identification information propagated from the network device to the central configuration server 26 may include:

1. The model of the network device;
2. A code level for the network device;
3. A list of optional features installed on the network device, such as for example extra memory or additional processors;
4. The number of interfaces available on the network device; and
5. Per port information, such as an interface identifier, a port hardware address, and interface type and speed information.

Logical configuration information to be included within the identification information propagated from the network device to the central configuration server 26 may include the following per port information:

1. An interface identifier;
2. IP subnets learned on the interface or, alternatively, IP addresses for neighbor routers; and
3. Connected networks of other protocols supported by the code level such as, for example IPX networks or AppleTalk zones.

Figure 6:
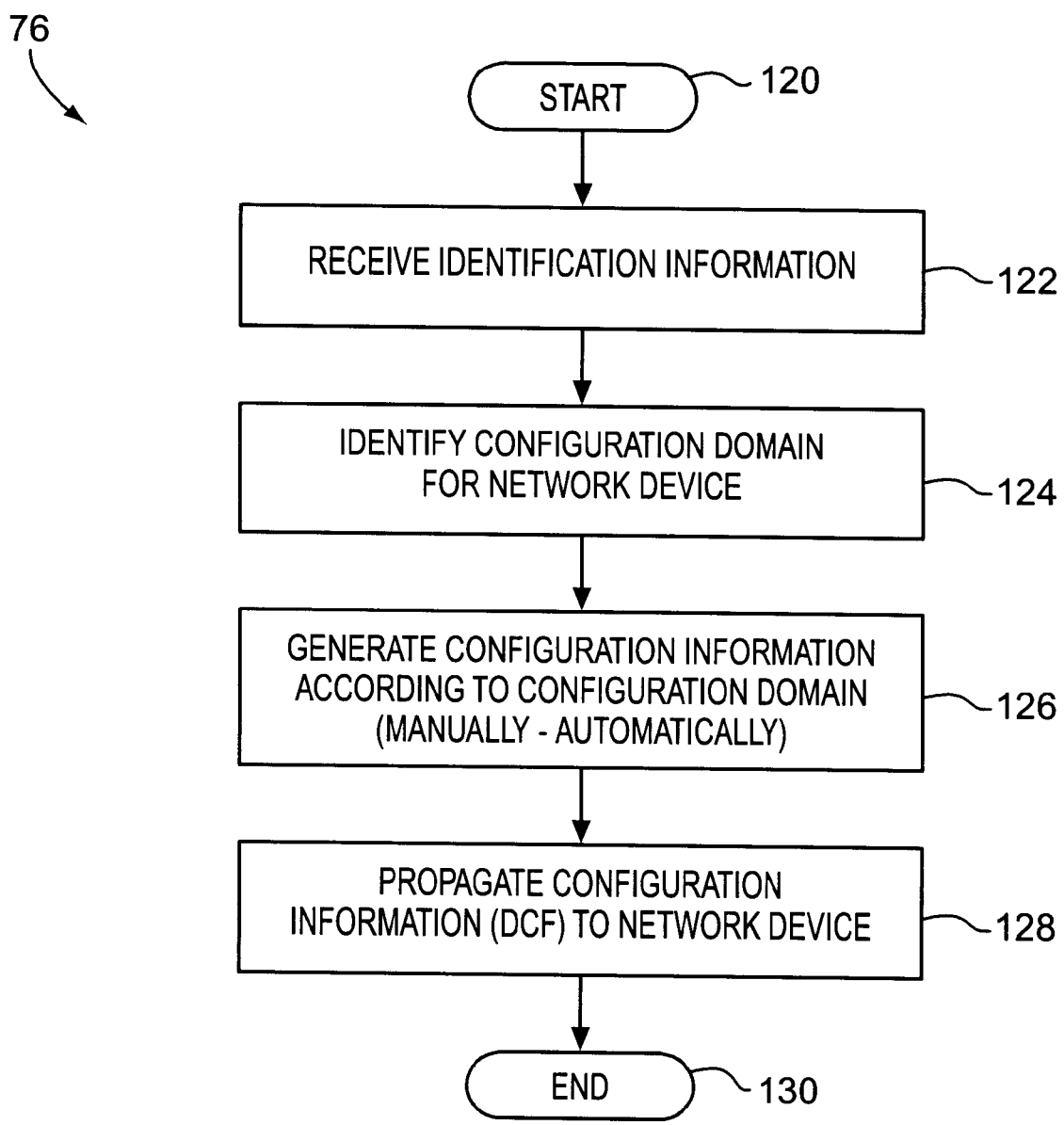
FIG. 6 is a flow chart illustrating a method, according to one exemplary embodiment of the present invention, of generating configuration information for a network device on the central configuration server and propagating this configuration information to the network device.

FIG. 6 is a flow chart illustrating a method 76, according to one exemplary embodiment of the present invention, of implementing the broad step 76 of the method 70 illustrated in FIG. 4; that is the step of constructing configuration information for a network device remotely of a network device and at the central configuration server 26. The method 76 commences at 120, and then proceeds to step 122, wherein the identification information, propagated from the network device at either step 90 or step 94 as illustrated in FIG. 5, is received at the central configuration server 26. At step 124, a configuration domain, subdomain or class to which the relevant network device belongs is identified. The process of identifying the relevant configuration domain is dependent upon the information supplied from the network device, and determines the extent to which the generation of configuration information at step 126 may be automated. For example, the generation of configuration information for a network device that is functioning as a leaf router may be automated to a greater extent than the generation of configuration information for a network device which is functioning as a core router. Specifically, as described above, certain network devices, such as core routers functioning as configuration domain border routers 60, may require location-specific, or function-specific configuration parameters, hat may be preconfigured on the network device in the form of a preconfiguration file 66 or "cookie". Other devices, on the other hand, within a configuration domain or subdomain may not require such location-specific configuration information. For such devices, it may be possible to generate generic configuration class parameters. Subdomain routers, for example operating as the routers, may fall into this category. Specifically, wherein a defined configuration domain is contained entirely within an OSPF area boundary, and a subdomain router is entirely within such an OSPF area, the router may be able to obtain information concerning the OSPF area. By propagating such information to the central configuration server 26, an appropriate configuration domain for the network device may be identified using this information.

Figure 9:
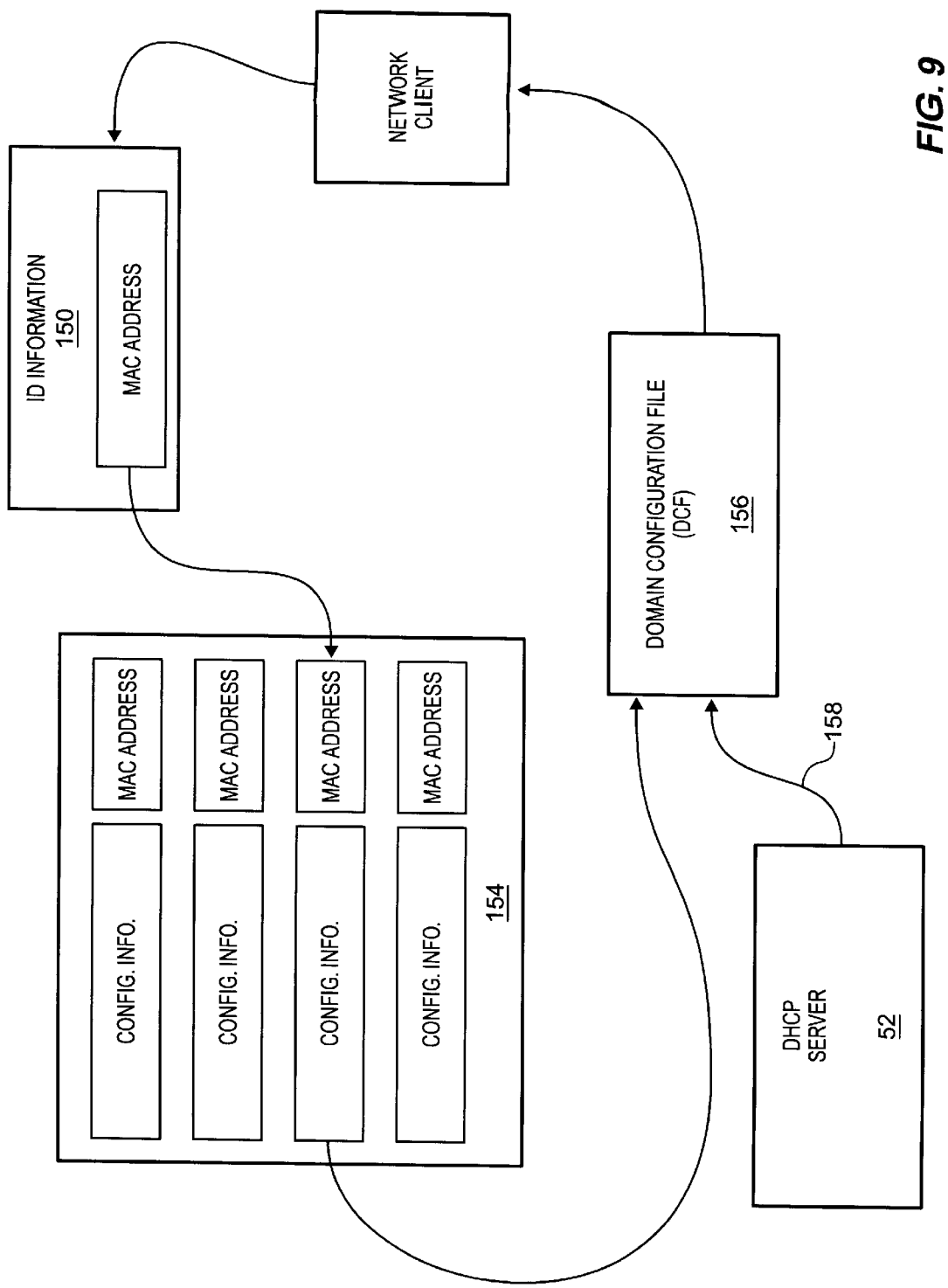
FIG. 9 is a block diagram showing an exemplary manner in which a configuration domain may be identified for a network device that requires location-specific configuration parameters.

FIG. 9 is a block diagram showing an exemplary manner in which a configuration domain may be identified for a network device that requires location-specific, or function-specific, configuration parameters, as required at step 124. Specifically, identification information 150 is shown to be received from the network device at the central configuration server 26. The identification information 150 is further shown to include a "cookie", for example in the form of a unique device-level MAC address 152. The central configuration server 26 may maintain a mapping of MAC addresses to configuration information in a table 154. The configuration information corresponding to the MAC address 152 is included within configuration information in the form of a domain Configuration File (DCF) 156. The DCF 156 may also include an IP address 158 generated by the DHCP server 52. In this case, the configuration domain to which the network device belongs may be considered location-specific to included only the relevant network device (i.e., a single-device domain).

Figure 10:
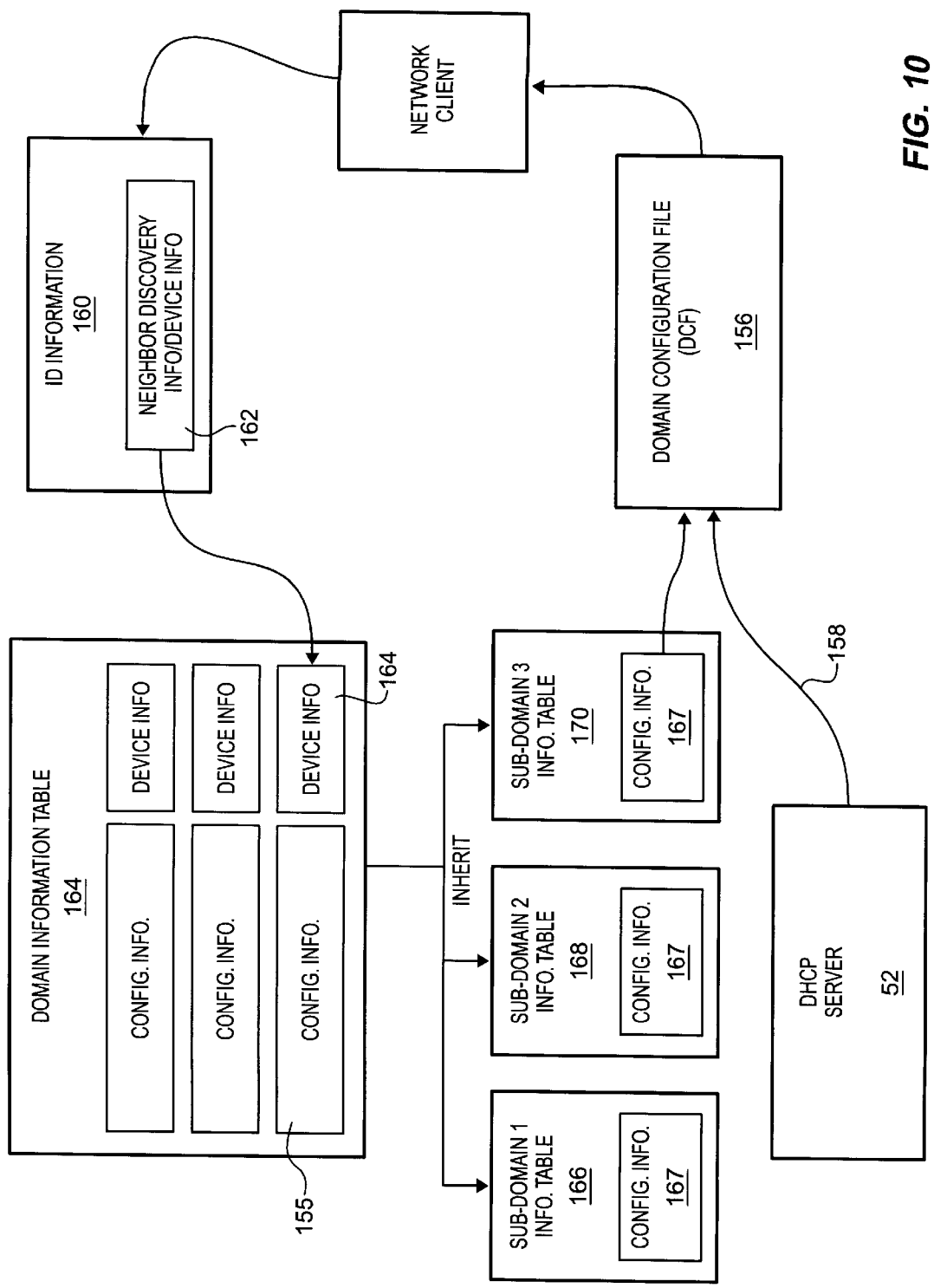
FIG. 10 is a block diagram illustrating an exemplary manner in which a configuration domain may be identified for a network device that does not require location-specific configuration parameters.

FIG. 10 is a block diagram showing an exemplary manner in which a configuration domain may be identified for a network device that does not require location-specific, or function-specific, configuration parameters. Specifically, identification information 160 is shown to be received from the network device at the central configuration server 26, this identification information 160 including information 162 discovered utilizing a neighbor discovery procedure. For example, the identification information 160 may include information concerning what subnets local interfaces of the network device are attached to, subnets masks, and routing protocols. At the central configuration server 26, the identification information 160 is utilized to identify a configuration domain (or configuration class) of which the network device forms a part. Specifically, the central configuration server 26 may maintain a mapping of identification information to generic configuration information 155 pertaining to, and appropriate for, a specific domain. It will be appreciated that, as generic configuration information 155 is maintained on a domain by domain basis and not a device by device basis, the size of information table 164 will be much reduced relative to the size of a similar table which stores configuration information on a device by device basis. As shown in FIG. 10, subdomain information tables 166, 168 and 170 may also be defined for each subdomain which exists within the configuration domain associated with the table 164. The subdomain tables 166–170 may maintain a mapping of subdomain-specific configuration information 167 to identification information, as may be generically applied to the appropriate subdomain. Further, the subdomain information tables 166–170 are shown to inherit configuration information from the domain information table 164, and accordingly need only store configuration information specific to a subdomain. The generic configuration information retrieved from the tables 164–170 is then included within configuration information, in the form of a DCF 156, propagated from the central configuration server 26 to the network device. The DCF 156 may again include an IP address 158 generated by the DHCP server 52.

The concept of configuration domains, and subdomains, is useful within the central configuration server 26 for limiting the amount of configuration information that must be maintained, as described above. Specifically, devices not requiring location-specific or function-specific configuration parameters may share common configuration attributes that can be effectively maintained at the central configuration server 26 as one set of default parameters (that is, the generic configuration information stored within the tables 164–170) appropriate for a set of network devices within a configuration domain. When a configuring network device requests configuration information from the server 26, the network device supplies identification information, either learned or pre-configured, to the server 26. Based on this identification information, the server 26 may identify the network device as belonging to one or more configuration domains or classes. The server 26 then supplements the default or common configuration parameters with any specific parameters for the device, such as an IP address from the DHCP server 52.

Returning to the flow chart shown in FIG. 6, configuration information for the configuring network device is generated at step 126 according to the configuration domain. As explained above with reference to FIGS. 9 and 10, this step of generating the configuration information may be fully manual, fully automatic, or partially manual and partially automatic. Specifically, where a network device is recognized as being located within a specific configuration domain, default configuration parameters for that configuration domain may be identified. Where additional configuration parameters, outside the ambit of the default configuration parameters, are required, these may be obtained by manually prompting a system administrator to input appropriate values. Alternatively, stored configuration information, previously inputted by the system administrator, may be accessed to supplement the default configuration parameters. At one end of the spectrum, the system administrator may be required to manually input all configuration parameters to construct the configuration information. At the other end of the spectrum, the configuring network device may be fully configurable using default configuration parameters, in which case configuration will be fully automated without system administrator input for the configuring device. It also significant that the input of non-default configuration parameters and the identification of default configuration parameters is performed at the central configuration server 26, which is located remotely of the configuring network device.

Figure 11:
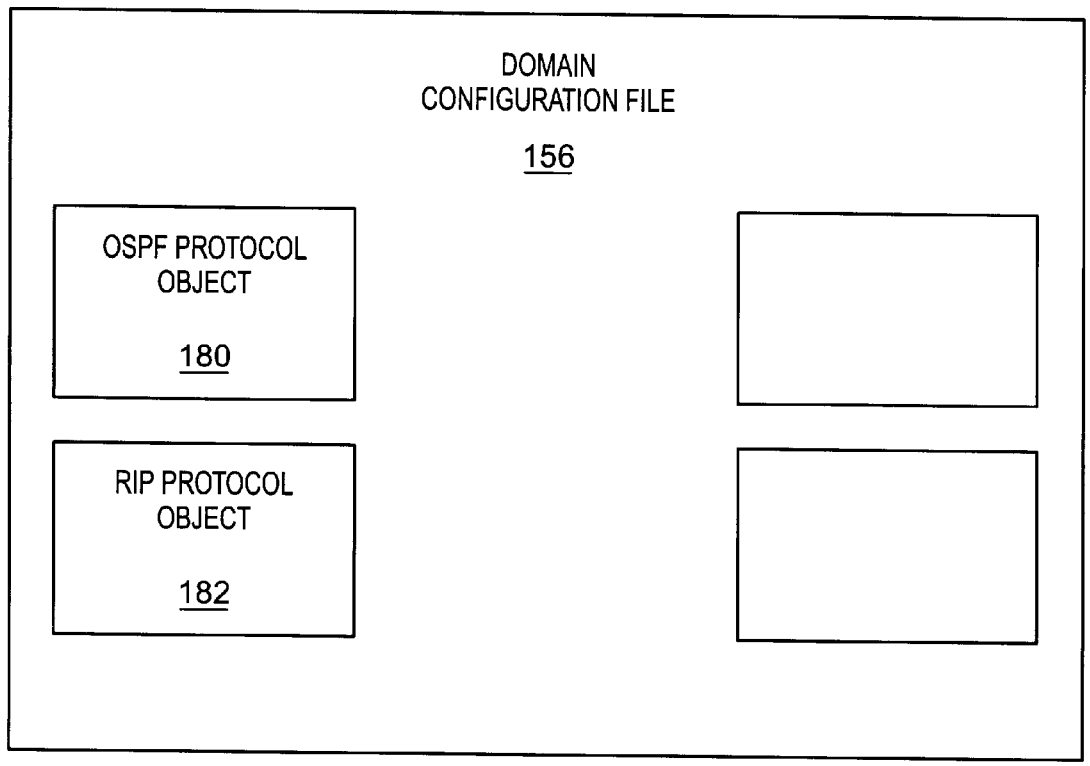
FIG. 11 is a block diagram illustrating a modified Domain Configuration File (DCF) constructed according to the teachings of the present invention.

At step 128, the central configuration server 26 then propagates configuration information, in the form of a DCF 156, to the configuring network device. FIG. 11 is a block diagram providing an illustration of an exemplary Domain Configuration File (DCF) 156. The DCF 156 is shown to be made up of a number of objects that contained configuration parameters for the configuring network device. Such objects may include an OSPF protocol object 180 that contains the necessary parameters for configuring OSPF interfaces of the configuring network device such as, for example, area identifiers and timer values. The DCF 156 may also include a RIP protocol object 182, which would be common to all DCF's 156 issued to configuring network devices within all configuration domains. Other objects included within the DCF 156 may include differentiated services and QoS parameters. For example, objects may specify queuing disciplines supported by the network device, such as for example round robin (RR), weighted round robin (WRR), weighted fair queuing (WFQ), priority queuing (PQ). A further object may include information regarding scheduling algorithms, such as for example random early detection (RED), weighted random early detection (WRED) and tail drop (TD). As with routing protocol information, the above mentioned parameters may all vary from interface to interface on the networking device, and the values configured for these parameters must be coordinated with those configured on other devices in the network in order to meaningfully provide the quality of service intended.

Figure 7:
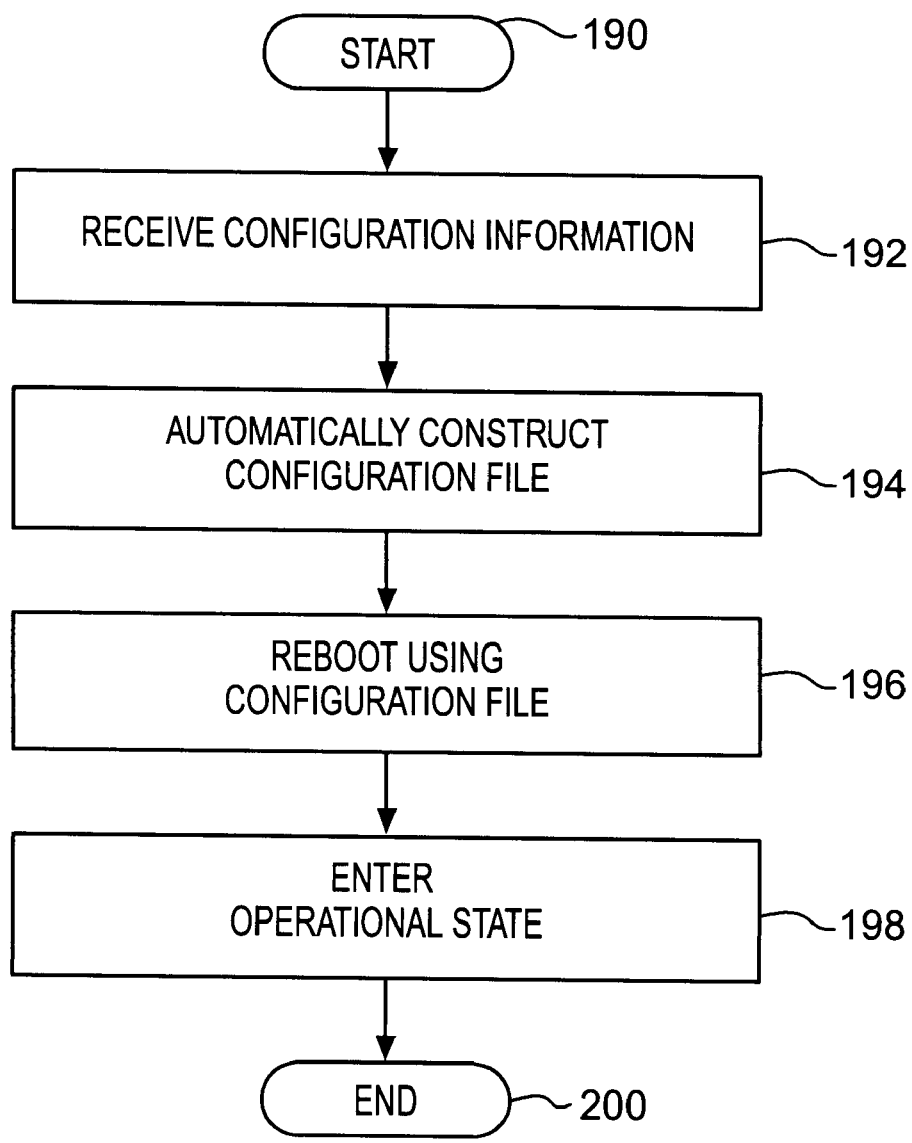
FIG. 7 is a flow chart illustrating a method, according to one exemplary embodiment of the present invention, of constructing a configuration file on a network device using configuration information received from the central configuration server.

After completing step 128, the method 76 terminates at step 130. FIG. 7 is a flow chart illustrating a method 78 of executing the broad step 78 of the method 70 shown in FIG. 4; that is the step of constructing a configuration file (config file) on a configuring network device. The method 78 commences at step 190, and proceeds to step 192 where the configuring network device receives configuration information, for example in the form of a DCF 156. At step 194, the configuring device automatically constructs a configuration file utilizing the configuration information contained in the DCF 156. At step 196, the network device then reboots using the newly generated configuration file, and then enters a fully operational and configured state at step 198. The method 78 then terminates at step 200.

Figure 12:
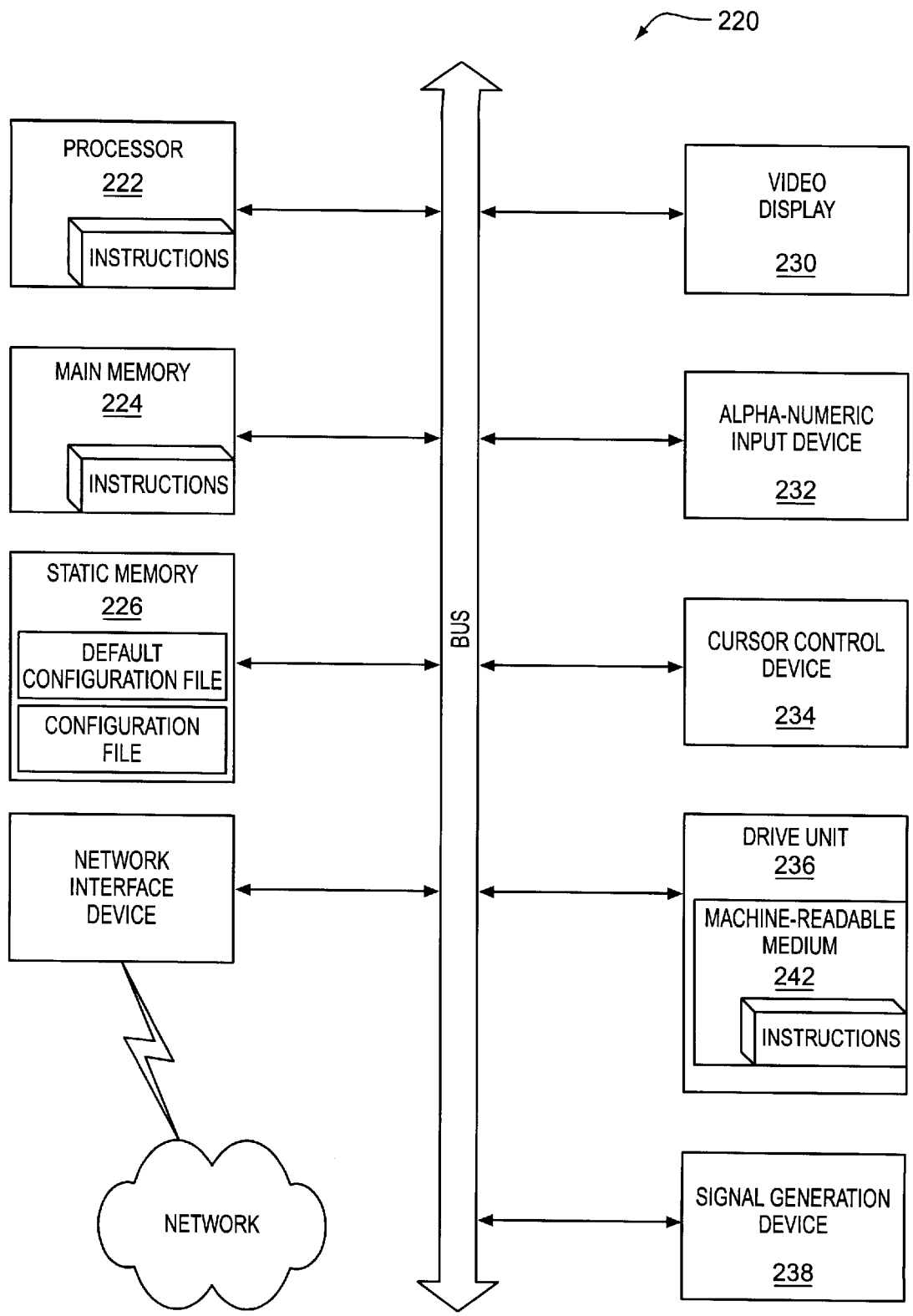
FIG. 12 is a diagrammatic representation of a machine within which instructions for executing any one of the methodologies of the present invention may be executed.

FIG. 12 is a diagrammatic representation of a machine 220, which may comprise a server, router, switch or any other computer system or network device, within which instructions for executing the methodologies described above may be executed. The machine 220 is described below as including a number of components. It will however be appreciated that, depending on the functionality of the machine 220, a number of these components may not be present. In addition, the machine 220 may include further components that are not described and illustrated. The machine 220 is shown to include a processor 222, a main memory 224 and a static memory 226, which communicate via a bus 228. The machine 220 may also optionally include a video display 230 (for example, a liquid crystal display (LCD) or a cathode ray tube (CRT)). The machine 220 further includes an alphanumeric input device 232 (for example, a keyboard), a cursor control device 234 (for example, a mouse), a disk drive unit 236, a signal generation device 238 (for example, a speaker) and a network interface device 240. The disk drive unit 236 accommodates a machine-readable medium 24 on which a sequence of instructions, embodying any one of the methodologies described above, may be stored. The instructions are also shown to reside, completely or at least partially, within the main memory 224, the static memory 226, or the processor 222. The instructions may furthermore be transmitted or received via the network interface device 240. Accordingly, for the purposes of the specification, the term "machine-readable medium" shall be taken to include any medium that is capable of storing or encoding a sequence of instructions for execution by a machine, and that cause the machine to perform the methodologies of the present invention. Specifically, the term "machine-readable medium" shall be taken to include, but not be limited to, solid-state memories, optical and magnetic disks, and carrier-wave signals.

In alternative embodiments, the present invention may be applicable to implementations of the invention in integrated circuits or chip sets, wireless implementations, switching system products and transmission system products. For the purposes of this application, the terms switching system products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services. The term transmission system products shall be taken to mean products used by service providers to provide interconnection between their subscribers and their networks such as loop systems, and which provide multiplexing, aggregation and transport between a service provider's switching systems across a wide area, and associated signaling and support systems and services.

Thus, a method and apparatus for remotely configuring a network device have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of remotely configuring a network device, the method including:

discovering identification information indicating a location of configuration information by utilizing a neighbor discovery process executed by the network device;

in response to receipt of the identification information from the network device at a location remote from the network device, propagating the configuration information to the network device;

automatically determining the location of the configuration information;

the network device initiating a file transfer procedure via a host configuration protocol to transfer the configuration information to the network device;

the network device utilizing the configuration information to generate a configuration file, wherein the configuration information for the network device is generated at the remote location using a topology database, and identifying a configuration domain to which the network device is assigned, the configuration information including a device configuration parameter, in accordance with the configuration domain, and a subnet identifier for each interface of the network device.

2. The method of claim 1, wherein the network device is a router and the device configuration parameter is a global router parameter.

3. The method of claim 1, wherein the device configuration parameter is a non-interface specific parameter.

4. The method of claim 1, wherein generating configuration information comprises at least partially generating the configuration information in a manual manner.

5. The method of claim 1, wherein generating configuration information comprises at least partially generating the configuration information in an automatic manner.

6. The method of claim 5 further comprising dynamically assigning a network address to the network device, and including the network address within the configuration information.

7. The method of claim 1 further comprising including routing protocol information within the configuration information.

8. The method of claim 1 further comprising including an IP address for each interface of the network device within the configuration information.

9. The method of claim 1, wherein the identification information includes a pre-configured configuration parameter value.

10. The method of claim 1, wherein the identification information includes a device-level MAC address.

11. The method of claim 1, wherein the information discovered includes any one or more of routing protocol, local interface subnet connection or subnet mask information.

12. The method of claim 1, wherein the configuration information includes a plurality of configuration objects.

13. The method of claim 1, wherein the remote location comprises a configuration server.

14. Apparatus for remotely configuring a network device, the apparatus including:
a central management system including a topology database and a central configuration server, which identifies a configuration domain to which the network device is assigned, to generate configuration information for the network device, the configuration server being remote from the network device, the configuration information including a device configuration parameter, in accordance with the configuration domain, and subnet information for each interface of the network device, and the configuration server upon receiving identification information, transfers to the network device the configuration information based on the identifier supplied within the identification information; and
a communications interface to propagate the configuration information from the configuration server to the network device in response to receipt of the identification information concerning the network device at the configuration server, wherein the identification information includes information discovered by a neighbor discovery procedure executed by the network device.

15. The apparatus of claim 14, wherein the network device is a router and the device configuration parameter is a global router parameter.

16. The apparatus of claim 14, wherein the device configuration parameter is a non-interface specific parameter.

17. The apparatus of claim 16, wherein the configuration server at least partially generates the configuration information responsive to the identification information in an automatic manner.

18. The apparatus of claim 17, wherein the configuration server includes a dynamically assigned network address within the configuration information.

19. The apparatus of claim 18 further including a server for automatically assigning the network address to the network device.

20. The apparatus of claim 14, wherein the configuration server automatically includes routing protocol information within the configuration information.

21. The apparatus of claim 14, wherein the configuration server automatically includes IP address information for each interface of the network device within the configuration information.

22. The apparatus of claim 14, wherein the identification information includes a pre-configured configuration parameter value.

23. The apparatus of claim 14, wherein the identification information includes a device-level MAC address.

24. The apparatus of claim 14, wherein the information discovered includes any one or more of routing protocol, local interface subnet connection or subnet mask information.

25. The apparatus of claim 14, wherein the apparatus comprises a switching system product.

26. The apparatus of claim 14 further comprises a transmission system product.

27. A machine-readable medium storing a sequence of instructions that, when executed by a machine, cause the machine to perform the steps of:
discovering identification information indicating a location of configuration information by utilizing a neighbor discovery process executed by a network device;
in response to receipt of the identification information from the network device at a location remote from the network device, propagating the configuration information to the network device;
automatically determining the location of the configuration information;
the network device initiating a file transfer procedure via a host configuration protocol to transfer the configuration information to the network device;
the network device utilizing the configuration information to generate a configuration file, wherein the configuration information for the network device is generated at the remote location using a topology database, and identifying a configuration domain to which the network device is assigned, the configuration information including a device configuration parameter, in accordance with the configuration domain, and a subnet identifier for each interface of the network device.

* * * * *